United States Patent [19]

Uchiyama

[11] Patent Number: 4,724,077

[45] Date of Patent: Feb. 9, 1988

[54] ROTARY DRUM FILTER WITH SLIDING PERFORATED BUCKETS

[76] Inventor: Tadao Uchiyama, 5-24-3 Matsugoaka, Funabashi-shi, Chiba-ken, Japan

[21] Appl. No.: 871,921

[22] Filed: Jun. 9, 1986

[51] Int. Cl.⁴ ............................................. B01D 33/06
[52] U.S. Cl. ..................................... 210/394; 210/403
[58] Field of Search ............... 210/393, 394, 396, 403, 210/297, 168; 209/294, 298

[56] References Cited

U.S. PATENT DOCUMENTS

| | | | |
|---|---|---|---|
| 1,019,907 | 3/1912 | Miller | 210/394 |
| 1,712,258 | 5/1929 | Compain | 210/394 |
| 2,196,793 | 4/1940 | Hall | 210/403 |
| 2,758,722 | 8/1956 | Murray | 210/403 |
| 4,224,166 | 9/1980 | Wyman | 210/403 |
| 4,477,349 | 10/1984 | Monteyne | 210/403 |

FOREIGN PATENT DOCUMENTS

| | | | |
|---|---|---|---|
| 211475 | 10/1908 | Fed. Rep. of Germany | 210/403 |
| 280260 | 8/1913 | Fed. Rep. of Germany | 210/403 |
| 2059281 | 4/1981 | United Kingdom | 210/403 |

Primary Examiner—Richard V. Fisher
Assistant Examiner—Linda S. Evans
Attorney, Agent, or Firm—Wenderoth, Lind & Ponack

[57] ABSTRACT

A filtering apparatus for filtering chips out of chip-containing waste liquid which includes a cutting oil collection tank and a filtering drum rotatably mounted in the tank. A waste liquid supply means, and a chip transport conveyor are provided for supplying chip-containing waste liquid into the filtering drum and removing chips therefrom, respectively. The filtering drum also includes annular guide groove members and buckets slidably supported by the guide groove members for removing larger chips while allowing smaller chips and oil to pass therethrough. The buckets prevent the larger chips from damaging a surface of the filtering drum on which the smaller chips are collected.

7 Claims, 3 Drawing Figures

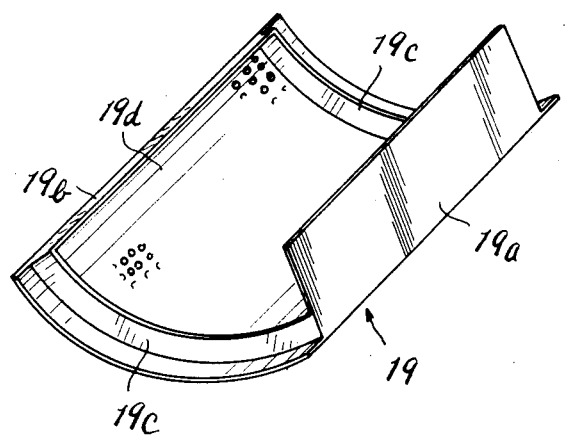

ROTARY DRUM FILTER WITH SLIDING PERFORATED BUCKETS

BACKGROUND OF THE INVENTION

This invention relates to a filtering apparatus suitably employed in filtering cutting oils containing metal chips therein (which oil will be referred to as "waste oil" hereinafter).

A variety of waste oil filtering apparatus are known which are adapted to filter waste oils containing both coarse and fine metal chips (hereinafter referred to as "chips") which are generated during cutting of metal workpieces. In one prior art filtering apparatus, a filtering drum (hereinafter referred to as "drum") includes a fine mesh filtering cloth stretched thereabout which is capable of filtering out fine chips as well as coarse chips. The drum is adapted to hold waste oil thrown therein and is rotatably mounted within a cutting oil collection tank whereby as the drum is rotated, the waste oil is centrifuged to separate the chips and cutting oil. The separated chips are carried out of the drum by means of a conveyor mechanism whereas the cutting oil from which the chips have been separated is forced to pass through the filtering cloth and is collected in the cutting oil collection tank and finally taken out of the collection tank. However, since the fine mesh filtering cloth stretched about the periphery of the drum is also required to filter out heavy coarse chips of the waste oil in addition to fine chips, the filtering cloth is easily subjected to severe damage. Thus, in the art to which the present invention portions, any mechanism which avoids damage to the filtering cloth has been desired up to the present time.

SUMMARY OF THE INVENTION

Thus, an object of the present invention is to provide a novel and improved filtering apparatus which is adapted to improve filtering efficiency of the filtering apparatus and avoid potential damage to the filtering cloth stretched about the periphery of the filtering drum.

According to the present invention, there has been provided a filtering apparatus which comprises a cutting oil collection tank, a filtering drum rotatably mounted in said cutting oil collection tank and comprising a pair of opposite annular plates, a chip-containing waste liquid supply means and a chip conveying means, and which is characterized by annular guide groove members secured to the inner sides of said annular plates and having abutment-stopper means and a plurality of movable buckets having arcuate perforated sheet metals in slidable engagement with said annular guide groove members.

The above and other objects and attendant advantages of the present invention will be more readily apparent to those skilled in the art from a reading of the following detailed description in conjunction with the accompanying drawings which show one preferred embodiment of the invention for purposes of illustration only, and is not to be construed as limiting the scope of the same in any way.

BRIEF DESCRIPTION OF THE DRAWINGS

FIG. 3 is a perspective view of one of the movable buckets of the filtering apparatus.

PREFERRED EMBODIMENT OF THE INVENTION

Figure 1:
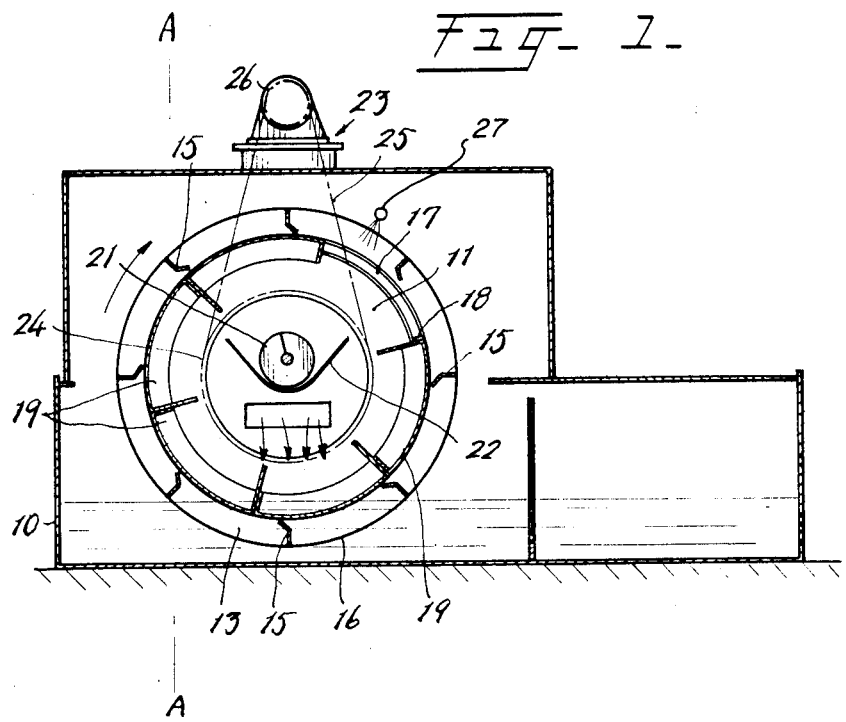
FIG. 1 is a vertically sectional view of the preferred embodiment of the filtering apparatus constructed in accordance with the principle of the present invention.

The present invention will now be described referring to the accompanying drawings in which the preferred embodiment of the filtering apparatus of the present invention is illustrated.

The filtering apparatus of the present invention generally comprises a cutting oil collection tank 10 and a filtering drum 11 journalled on cylindrical bearings 12, 12 which are in turn secured to the opposite or right-hand and left-hand side walls of the tank 10. The drum 11 is in the form of a hollow cylinder which is defined by a pair of opposite and spaced apart annular plates 13, 13 each having an outwardly extending boss 14 on the inner periphery thereof by means of which the annular plate is rotatably supported on the associated cylindrical bearing 12 whereby the drum is supported in the tank for rotational movement relative to the latter. The drum 11 is supported in the cutting oil collection tank 10 such that a portion of the periphery of the drum is always immersed in the body of cutting oil held in the cutting oil collection tank.

A plurality of peripherally spaced scoops 15 extend between and are secured at the opposite ends thereof to the opposing annular plates 13, 13 on the outer peripheries of the plates to thereby connect the annular plates together, and a fine mesh filtering cloth or screen 16 is stretched over and secured to the outer side edges of the scoops 15.

An annular guide member 17 is secured to and extends radially inwardly from the inner surface of each of the annular plates 13, 13 coaxially with respect to the axis of rotation of the drum 11 and abutment-stopper means 18 comprising a member which extends radially inwardly from each guide member. A plurality of movable buckets 19 are supported in the annular guide members 17, 17 for slidable movement therealong.

As more clearly shown in FIG. 3, the movable bucket 19 is in the form of an open bottomed arcuate-shaped frame member and includes a first longer side wall 19a which serves as a chip throwing portion, a second shorter side wall 19b, end walls 19c, 19c and a perforated sheet metal 19d extending over the opening defined by the side and end walls and having the same curvature as a groove in each guide member 17. The sheet metal 19d is provided with a number of small perforations serving as primary filtering means. As seen in the direction of movement or rotation of the bucket 19, the first longer side wall 19a is on the trailing side and the second shorter side wall 19b is on the leading side. A plurality of the buckets 19 having the above-mentioned construction are arranged with arcuate ends of the perforated sheet metal 19d in slidable engagement with opposite grooves in the guide members 17, 17 and facing the filtering cloth is stretched over the scoops 15. The length of the circumference of the annular guide member 17 is greater than the length of the combined widths of the perforated sheet metals 19d of the buckets 19 (measured along the arcuate end between the side walls 19a, 19b of each sheet metal 19d). The difference determines the range of slidable movement of the movable buckets 19.

The perforations formed in the sheet metal 19d are coarser or larger in size than the mesh of the filtering cloth 16.

Figure 2:
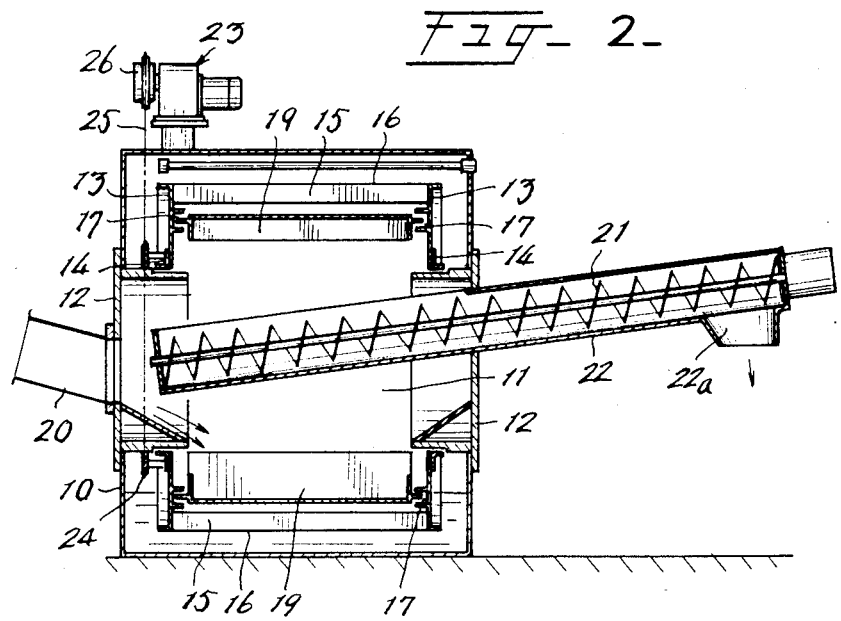
FIG. 2 is a vertically sectional view of the filtering apparatus taken along the line A—A of FIG. 1.

In order to supply chip-containing waste liquid to be filtered into the filtering apparatus, a supply tube 20 extends through the cylindrical bearing 12 associated with one of the side walls (the left-hand side wall as seen in FIG. 2) of the cutting oil collection tank 10. The supply tube 20 extends beyond the boss 14 on the annular plate 13 associated with the above-mentioned one cylindrical bearing 12 into the drum 11 to throw the waste liquid into the drum. The other or outer end of the supply tube 20 is connected to a waste liquid supply source (not shown).

In order to remove chips filtered from the waste liquid out of the filtering apparatus, an outwardly upwardly inclined conveyor 21 is provided. The conveyor 21 extends through the other or right-hand side cylindrical bearing 12 into the drum 11 and terminates within the left-hand side cylindrical bearing 12. The screw conveyor 21 is encircled by a similarly inclined conveyor duct 22 which has an inner end portion positioned within the left-hand side bearing and is open on the top thereof. The chips filtered from the waste liquid are thrown into the conveyor duct 22 through the open top and are carried out of the filtering apparatus by the screw conveyor 21 which has an outer end suitably connected to a suitable drive source (not shown) for driving the screw conveyor. The conveyor duct 22 is open downwardly at the outer end thereof to provide a chip discharge opening 22a and is supported at the inner end on the cylindrical bearing 12 associated with the left-hand side wall of the cutting oil collection tank 10.

A drive motor 23 is mounted on the top wall of the cutting oil collection tank 10 and is operatively connected to a pulley 24 secured to the left-hand side annular plate 13. An endless belt 25 is trained about a pulley 26 on the output shaft of the motor 23 and the pulley 24, whereby when the motor is actuated, the drum 11 is rotated through the transmission arrangement 24, 25 and 26.

A cleaning means in the form of a fluid jet 27, such as water, is provided on the tank 10 above the drum 11 to remove chips adhering to the filtering cloth 16 and movable bucket filtering sheet metals 19d.

Also, although not shown, a pump is provided to pump the filtrate out of the tank 10.

In operation, when the drive motor 23 is energized, the drum 11 is rotated in the clockwise direction as shown in FIG. 1, for example, and at the same time, the drive source associated with the screw conveyor 21 is energized to drive the screw conveyor. The water jet 27 is also actuated. With the drum 11 rotating and the screw conveyor 21 being driven, as chip-containing waste liquid is supplied through the supply tube 20 into the drum 11, the waste liquid is thrown into the successive buckets 19 when they are in turn positioned on the bottom of the tank 11. While the drum 11 and more particularly, the guide groove members 17, 17 secured to the annular plates 13 of the drum 11 are rotating in the clockwise direction, the abutment-stopper means 18 on the guide groove members 17, which are then engaging the first longer side wall 19a of the bucket 19 which is positioned immediately downstream of the abutment-stopper means 18 in the guide path defined by the guide groove members 17, push the successive abutting buckets 19 to cause the buckets to rotate in the clockwise direction. As the buckets 19 are rotated by the drum 11 rotating in the clockwise direction, the buckets 19 are moved in a circular path while allowing the fine chips and waste liquid to pass through the perforated sheet metals 19d of the buckets 19 leaving the coarse chips therein. The waste liquid then passes through the fine mesh filtering cloth 16 which filters out the fine chips from the waste liquid and retains the fine chips thereon.

After the waste liquid and fine chips have passed through the buckets, i.e., when the first longer side walls 19a of the successive inclined buckets 19 holding the coarse chips therein assume a position above the open top of the conveyor duct 22, the coarse chips fall down the bucket first longer side walls 19a into the duct 22. On the other hand, the fine chips separated from the waste liquid by the filtering cloth 16 and retained thereon and accumulated on the cloth by the scoops 15, fall down by their own weight into the conveyor duct as the scoops 15 pass in succession the topmost point in the movement path of the scoops. The removal of the fine chips from the filtering cloth and scoops is accelerated by the force of water under pressure issuing from the water jet 27.

As the buckets 19 are caused to rotate in the clockwise direction by the abutment-stopper means 18 on the rotating guide groove members 17 which abut against the bucket 19 positioned immediately downstream of the abutment-stopper means 18 in the movement or rotational path of the guide groove members 17, when the buckets 19 successively pass the topmost point in the movement path of the buckets, the buckets slide forward in the path by gravity due to their own weight. The gravitative downward movement of all of the buckets 19 is arrested by the abutment-stopper means 18 on the guide groove members 17. More particularly, the gravitative downward movement of the bucket 19 positioned immediately upstream of the abutment-stopper means 18 in the guide path of the buckets is arrested when the second shorter side wall 19b of that bucket 19 abuts against the abutment-stopper means 18 and the gravitative downward movement of the trailing buckets is arrested by the abutment of the second shorter side walls 19b on the successively trailing buckets 19 against the first longer side walls 19a of the successively preceding buckets 19.

By repeating the above-mentioned procedure, a predetermined filtering operation is conducted and the chips filtered out of the waste liquid fall down into the conveyor duct after which the chips are conveyed by the conveyor and discharged out of the duct at the discharge port or opening 22a therein.

As clear from the foregoing description of the preferred embodiment of the filtering apparatus according to the present invention, since the movable buckets 19 which have the filtering function are disposed within the filtering drum, the buckets perform a primary filtering function to thereby enhance filtering efficiency on the filtering apparatus and since the waste liquid thrown into the filtering drum does not strike directly against the filtering cloth stretched about the periphery of the filtering drum, damage to the cloth can be effectively avoided.

What is claimed is:

1. In a filtering apparatus comprising a cutting oil collection tank, a filtering drum rotatably mounted in said cutting oil collection tank and comprising a pair of opposite annular plates, a chip-containing waste liquid supply means and a chip conveying means adapted to transport chips separated from said waste liquid, the improvement comprising annular guide groove members secured to the inner sides of said annular plates, a plurality of movable buckets comprising arcuate perforated sheet metals in slidable engagement with said annular guide groove members and abutment-stopper means associated with said guide groove members for engaging at least one of said buckets whereby said buckets are moved in a circular path as said drum rotates.

2. The filtering apparatus as set forth in claim 1, wherein said filtering drum further comprises a plurality of scoops extending between and secured at opposite ends thereof to said annular plates, and a filtering cloth stretched about said scoops.

3. The filtering apparatus as set forth in claim 1, wherein each of said movable buckets is in the form of an open bottom sector and includes first longer and second shorter side walls, end walls and a respective one of said arcuate perforated sheet metals covering said open bottom.

4. The filtering apparatus as set forth in claim 3, wherein said buckets are arranged with said first longer walls trailing said second shorter side walls with respect to the direction of rotation of said filtering drum.

5. The filtering apparatus as set forth in claim 1, wherein the length of the circumference of the guide path defined by said guide groove members is greater than the length of the combined widths of said arcuate perforated sheet metals.

6. The filtering apparatus as set forth in claim 1, wherein each said arcuate perforated sheet metal has the same curvature as said annular guide groove member.

7. The filtering apparatus as set forth in claim 1, wherein said abutment-stopper means comprises members extending radially inward from each of said annular guide groove members.

* * * * *